United States Patent [19]

Siemssen

[11] 4,216,183

[45] Aug. 5, 1980

[54] METHOD FOR MAKING FURNACE LINING

[75] Inventor: Ernst A. Siemssen, Gwynedd, Pa.

[73] Assignee: Selas Corporation of America, Dresher, Pa.

[21] Appl. No.: 606,859

[22] Filed: Aug. 22, 1975

[51] Int. Cl.² .................. C04B 33/32; C04B 35/16
[52] U.S. Cl. .................................... 264/80; 427/223
[58] Field of Search .......................... 264/80; 427/223

[56] References Cited

U.S. PATENT DOCUMENTS

| | | | |
|---|---|---|---|
| 2,537,165 | 1/1951 | Smith et al. | 264/80 |
| 3,944,685 | 3/1976 | Gunnerman | 264/80 |

FOREIGN PATENT DOCUMENTS 172663  11/1964  U.S.S.R. .................................. 427/223

*Primary Examiner*—John A. Parrish
*Attorney, Agent, or Firm*—Miller & Prestia

[57] ABSTRACT

The method for making material to be used as a furnace lining, comprising forming a block of ceramic fibers in a desired shape and fusing the surface thereof with a flame at a temperature higher than any temperature to which it is intended that the material will be subjected when in use.

6 Claims, No Drawings

METHOD FOR MAKING FURNACE LINING

The present invention relates to industrial furnaces, and more particularly to the production of a material to be used as a lining for furnaces and burner cups.

In most industrial furnaces the walls are made of refractory brick or a castable refractory of some sort. These materials are heavy and have poor insulating qualities. They are also subject to spalling and cracking in use.

It is well known that various fibrous materials such as ceramic fibers of alumina and silicon oxide will withstand high temperature, and have good insulating value. These materials, however, have not heretofore been widely used as walls for furnaces because of their relatively soft surface presented and the erosive effect of furnace gases flowing past this surface. The fibrous surface is worn away unevenly, depending upon furnace convection currents, so that after a short time, the lining is not uniform.

It is an object of the present invention to provide a means for preparing fibrous material so that it can be used as a furnace lining.

It is a further object of the invention to prepare the surface of a block of fibrous material so that it will not be affected by the flow of gases past it and will radiate heat therefrom.

In practicing the invention, a ceramic fibrous material is formed into a rigid block or mat by conventional means. The block is then cut to the desired shape. Thereafter the surface of the block exposed to the interior of the furnace is fused at a temperature higher than a temperature to which it will be subjected. The fused surface will withstand erosion and will radiate heat.

The various features of novelty which characterize my invention are pointed out with particularity in the claims annexed to and forming a part of this specification. For a better understanding of the invention, however, its advantages and specific objects attained with its use, reference should be had to the accompanying descriptive matter in which I have described a preferred embodiment of the invention.

DETAILED DESCRIPTION

The furnace lining of the invention is made from a block of ceramic fibers of commercial grade. These fibers are usually alumina, about 43–47%, and silicon oxide, about 50–54%. The blocks can be obtained in various sizes and the fibers can be moulded to various shapes. The blocks have excellent insulating properites and are unaffected by temperatures to 2300° F. The fibers will melt at about 3200° F.

Ceramic fibers of this type are available commercially in bat or block form and have been used for furnace insulation in various thicknesses. Their use, however, has been limited to those furnaces or parts of furnaces where there is a relatively low rate of flow of gases past them. This is because the fibrous nature of the surface presented to the furnace interior by the fibrous blocks results in a fairly rough and soft surface that is easily eroded by the flow of gases past the surface.

In practicing the invention, the surface of a block of ceramic fibers to form the face of the furnace wall is fused by a high temperature flame such as an oxy-acetylene flame. This is accomplished by directing the flame against the surface of the block just long enough to melt or fuse a thin layer of the surface. As soon as the flame is removed, the fused layer will solidify into a smooth, hard crust. Ordinarily, the flame will be played on the block surface only long enough to obtain a crust or hard surface layer an eighth of an inch or so thick. The surface layer can be made thicker if desired by keeping the flame on the block a longer time. This, however, is not required for most furnace applications. It is noted that an oxy-acetylene flame is approximately 5600° F. This is much higher than any temperature to which furnaces using the present lining will ever be heated, therefore, the surface of the block will not later be affected by furnace temperatures. Obviously, the thickness of the block and its insulating value will not be materially affected since only a thin layer is fused.

The smooth surface of furnace lining elements made in this fashion will withstand the eroding effect of high velocity furnace gases. In addition, the surface will reflect radiant heat, thus increasing its effectiveness as an insulation.

The blocks can be made or cut to desired sizes and shapes to conform to the furnace structure with which they are used. The fibrous material can also be moulded in cup shapes to be used as cups for radiant cup burners, for example. It is preferred that the fibrous material be moulded or cut to its final shape before its face is heated to fusion temperature.

Since the lining elements of the invention are light in weight, the supporting structure of any furnace in which they are used can be of relatively light construction. This means that it is economical to build. The lining can be assembled in place by relatively unskilled labor in ways conventionally used for erection of linings of fibrous bats or blocks.

Thus it will be apparent that a furnace using the lining of this invention will be relatively inexpensive to construct. In addition the low heat inertia of the lining permits a furnace using it to be rapidly brought up to temperature and cooled, thus reducing fuel requirements.

While in accordance with the provisions of the Statutes I have described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a method of preparing lightweight, erosion resistant elements having low heat inertia to be used as furnace lining, the steps comprising forming a rigid block of ceramic fiber material of a predetermined shape and thickness, said ceramic fiber material comprising alumina and silicon oxide, subjecting the surface of the block that is to face the furnace interior to the action of a high temperature flame, melting the ceramic fibers of a thin layer of said surface with said flame, and causing the melted thin layer of said surface to solidify into a smooth non-fibrous thin hard crust, said high temperature flame being at a temperature higher than any temperature to which said surface is intended to be subjected when in use within said furnace.

2. The method of claim 1 in which said high temperature flame is an oxy-acetylene flame at approximately 5600° F. and the intended furnace temperature is no more than about 2300° F.

3. The method of claim 1 in which the block of ceramic fiber material is shaped to form the cup of a radiant burner and wherein said high temperature flame is applied to the cup.

4. The method of claim 1 wherein said forming step comprises molding.

5. The method of claim 1 wherein said forming step comprises cutting.

6. The method of claim 1 wherein said melting step is continued only long enough to produce a hard surface layer about an eighth of an inch thick.

* * * * *